US011566610B2

(12) United States Patent
Khan

(10) Patent No.: US 11,566,610 B2
(45) Date of Patent: Jan. 31, 2023

(54) WAVE-POWERED GENERATOR

(71) Applicant: Ghazi Khan, Marengo, IA (US)

(72) Inventor: Ghazi Khan, Marengo, IA (US)

(73) Assignee: Ghazi Khan, Marengo, IA (US)

( * ) Notice: Subject to any disclaimer, the term of this patent is extended or adjusted under 35 U.S.C. 154(b) by 271 days.

(21) Appl. No.: 15/929,641

(22) Filed: May 14, 2020

(65) Prior Publication Data

US 2021/0355925 A1 Nov. 18, 2021

(51) Int. Cl.
*F04B 35/00* (2006.01)
*F03B 13/24* (2006.01)
*F03B 13/16* (2006.01)

(52) U.S. Cl.
CPC ............ *F04B 35/004* (2013.01); *F03B 13/16* (2013.01); *F03B 13/24* (2013.01)

(58) Field of Classification Search
CPC ......... F04B 35/004; F03B 13/16; F03B 13/24
See application file for complete search history.

(56) References Cited

U.S. PATENT DOCUMENTS

| | | |
|---|---|---|
| 960,478 A | 6/1910 | Allard |
| 1,008,682 A | 11/1911 | Wall |
| 1,008,683 A | 11/1911 | Wall |
| 1,331,209 A | 2/1920 | Phillips |
| 2,715,366 A | 8/1955 | Vartiainen |
| 2,783,022 A | 2/1957 | Salzer |
| 3,149,776 A | 9/1964 | Parrish |
| 3,231,749 A | 1/1966 | Hinck, III |
| 3,362,336 A | 1/1968 | Kafka |
| 3,487,228 A | 12/1969 | Kriegel |
| 3,515,889 A | 6/1970 | Kammerer |
| 3,546,473 A | 12/1970 | Rich |
| 3,603,952 A | 9/1971 | Smith |
| 3,685,291 A | 8/1972 | Fadden, Jr. |
| 3,696,251 A | 10/1972 | Last et al. |
| 3,783,302 A | 1/1974 | Woodbridge |
| 3,870,893 A | 3/1975 | Mattera |
| 3,870,896 A | 3/1975 | Kiko |
| 3,911,287 A | 10/1975 | Neville |
| 3,912,938 A | 10/1975 | Filipenco |
| 3,918,260 A | 11/1975 | Mahneke |
| 3,965,364 A | 6/1976 | Gustafson et al. |
| 3,986,787 A | 10/1976 | Mouton, Jr. et al. |
| 4,022,549 A | 5/1977 | Gregg |
| 4,078,871 A | 3/1978 | Perkins, Jr. |
| 4,110,630 A | 8/1978 | Hendel |
| 4,152,895 A | 5/1979 | Wirt |
| 4,206,601 A | 6/1980 | Eberle |

(Continued)

*Primary Examiner* — Viet P Nguyen

(74) *Attorney, Agent, or Firm* — McKee, Voorhees & Sease, PLC

(57) ABSTRACT

A machine and process to compress ambient air using natural swell of ocean waves to store energy. The devise is a bi-directional air pump operated by ocean wave power of water buoyancy as well as earth gravity in a pressure vessel using a piston. The machine uses a large surface area as float connected by a rod to a small area as piston, housed in a pressure vessel to multiply compression of air. The compression of air is directly proportional to the respective surface areas of float to the piston attached with a rod inside the pressure vessel. An array of similar machines can be employed to multiply potential energy output.

18 Claims, 11 Drawing Sheets

(56) References Cited

U.S. PATENT DOCUMENTS

| | | |
|---|---|---|
| 4,208,877 A | 6/1980 | Evans et al. |
| 4,208,878 A | 6/1980 | Rainey |
| 4,209,283 A | 6/1980 | Marbury |
| 4,228,360 A | 10/1980 | Navarro |
| 4,231,712 A | 11/1980 | Shing-Hsiung |
| 4,239,976 A | 12/1980 | Collard |
| 4,242,593 A | 12/1980 | Quilico et al. |
| 4,260,901 A | 4/1981 | Woodbridge |
| 4,263,516 A | 4/1981 | Papadakis |
| 4,281,257 A | 7/1981 | Testa et al. |
| 4,400,940 A | 8/1983 | Watabe et al. |
| 4,434,375 A | 2/1984 | Taylor |
| 4,447,740 A | 5/1984 | Heck |
| 4,539,485 A | 9/1985 | Neuenschwander |
| 4,552,514 A | 11/1985 | Hagen |
| 4,560,884 A | 12/1985 | Whittecar |
| 4,563,591 A | 1/1986 | Jones |
| 4,598,210 A | 7/1986 | Biscomb |
| 4,631,921 A | 12/1986 | Linderfelt |
| 4,698,969 A | 10/1987 | Raichlen et al. |
| 5,052,902 A | 10/1991 | Labrador |
| 5,066,867 A | 11/1991 | Shim |
| 5,084,630 A | 1/1992 | Azimi |
| 5,094,595 A | 3/1992 | Labrador |
| 5,136,173 A | 8/1992 | Rynne |
| 5,289,999 A | 3/1994 | Naujeck et al. |
| 5,411,377 A | 5/1995 | Houser et al. |
| 5,424,582 A | 6/1995 | Trepl, II et al. |
| 5,512,787 A | 4/1996 | Dederick |
| 5,696,413 A | 12/1997 | Woodbridge et al. |
| 5,929,531 A | 7/1999 | Lagno |
| 6,000,353 A | 12/1999 | De Leu |
| 6,132,180 A | 10/2000 | Kojima |
| 6,216,455 B1 | 4/2001 | Doleh et al. |
| 6,328,539 B1 | 12/2001 | Hung |
| 6,360,534 B1 | 3/2002 | Denniss |
| 6,622,483 B2 | 9/2003 | Denniss |
| 6,717,284 B2 | 4/2004 | Lin |
| 6,812,588 B1 * | 11/2004 | Zadig .............. F04B 17/00 417/331 |
| 7,059,123 B2 | 6/2006 | Welch, Jr. et al. |
| 2002/0162326 A1 | 11/2002 | Brumfield |
| 2007/0130929 A1 * | 6/2007 | Khan .............. F03B 13/185 60/398 |

\* cited by examiner

WAVE-POWERED GENERATOR

FIELD OF THE INVENTION

The present invention relates generally to an apparatus and corresponding method of use in at least the renewable energy industry. More particularly, but not exclusively, the present invention relates to a wave-powered generator. As will be understood, any of the aspects disclosed herein may be used to adapt machines or engines which include power stations capable of harvesting tide energy through the relative movement between a wave-operated member, such as a wom, and a reaction member, such as a rem, fixed with respect to the sea bed or shore.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

There have been many attempts to find a viable option to harness sea wave energy, none of which have yet proved to be cost-effective. Universities and government institutions with access to large amounts of public funding have most frequently tried, boxing wave energy in several different ways.

Private industry has pursued several variations of closed loop systems of non-viable efficiencies, in large part because the required pressure cannot be achieved by simply covering the wave raised area to gain air pressure. The pressure distributes evenly in all directions, and thus, the pressure at the exit side diminishes significantly therefore air velocity is used as a last resort. Moreover, during inflation and deflation cycles, a major portion of incoming energy is cancelled out by the outgoing deflating energy.

These pioneers have thus only been using a small portion of a half curve of the sea wave which has resulted in little success.

Known classifications for existing wave technologies include: attenuator, point absorber, oscillating wave surge converter (OWSE), oscillating water column (OWC), overtopping, submerged pressure differential, bulge wave, rotating mass, water mass gravity force, and tidal energy devices. Specific wave energy conversion devices include the device of commonly-owned U.S. Pre-grant Pub. No. 2007/0130929, which is herein incorporated by reference in its entirety, as well as those other devices referenced therein.

Whist significant technological advances have been made in the conversion of energy from some of these alternative areas such as wind and solar, the majority of wave powered generation systems proposed to date has not been physically practical and/or economically viable.

In this regard, numerous different types of wave powered generation systems have been proposed, most of which are founded on the basic principle of using the vertical motion inherent in the movement of waves to effect a corresponding displacement of a component of the generating system. However, all of the systems proposed so far have had their limitations.

For example, one such system utilizes oscillating floating paddles, the motion of which is converted directly or indirectly to electrical power. However, these floating paddle systems generally have low energy conversion efficiency and are unable to withstand adverse weather conditions.

Other systems include those based on the concept of channeling the waves through water displacement pumps, or alternatively into large accumulators or reservoirs, the hydrostatic pressure of the stored water subsequently being used to drive a turbine generator or the like. Again, the overall energy conversion efficiency is relatively low given the associated capital costs.

One of the alternative types of systems proposed so far, is that in which the vertical movement of the waves is translated to rotary movement to directly or indirectly drive a generator. In these systems the rising and falling sea water is channeled toward and harnessed within an air compression chamber. The chamber has at its exit an outlet duct or venturi, in which is located a wind turbine of a kind operable to rotate unidirectional under the periodically oscillating air flows induced by the wave motion.

Again, the main deficiencies with these wave driven air turbine systems is the restricted overall achievable energy efficiencies. This is due primarily to the limitations in the means of focusing the wave energy to maximize the wave displacement amplitude, and secondarily due to the operating efficiencies inherent in the turbine design.

Most of the prior art wave focusing devices have relied on planar reflection of the wave front and/or channeling of the wave front through a narrowed opening such that the vertical displacement or amplitude of the wave is magnified. Others include various means to alter the formation of the sea bed to controllably disrupt the wave propagation, so as to thereby maximize the wave amplitude at a predetermined location. Once again these types of systems have been limited so far in respect of the maximum achievable wave amplification for a given level of capital expenditure.

Most prior art turbines are designed for constant velocity rotation in response to fluid flow in one direction only, and as such are unable to operate continuously in response to the reversing fluid flow conditions present in wave powered applications of the kind discussed above. However, a number of specially configured unidirectional turbines have been designed for these reversing flow conditions, the most commonly used devices being based on what is known as the "Wells" turbine.

The original Wells turbine had a monoplane axial fan type structure with radially extending blades of an airfoil section that were generally symmetrical about the chord line where the blades are fixed with their planes of zero lift normal to the axis of the rotor.

These early turbines were known to suffer from stalling, often resulting in the shutdown of the wave energy harnessing plant. This stalling occurs due to the fact that such a turbine needs to be designed around anticipated levels of air flow. The size of the waves entering the turbine chamber cannot be controlled for all occasions. Therefore, when a larger sized wave enters the chamber, the momentum of the wave causes a correspondingly greater air flow rate through the turbine blades. As the rate of rotation of the blades is increases correspondingly to counter this increased airflow, the angle of attack of the airflow to the blades increases beyond the stalling angle and the turbine shuts down.

Some later prior art devices have attempted to overcome this problem by effectively installing two monoplane Wells turbines in series resulting in a bi-plane turbine. While this modified system solves the stalling problem, it does so at a penalty to the overall efficiency. This is because it sacrifices the first set of blades by allowing them to correspondingly stall and shut down, the second set of blades then continuing operation at a reduced pace and efficiency. This is due to the total air flow rate having now been decreased and smoothed out by the stalling and interruption of the air flow by the first turbine.

These prior art turbines usually rely on a low revving high mass construction in order to ensure smooth continuous rotation under periodically reversing driving air flows of the kind contemplated. These prior art turbines are often quite complex in design and usually have severe limitations in relation to operating conditions and/or efficiencies.

Most wave energy extraction devices were based on spinning motion but they were not effective enough because the frequency of waves and its force is always unpredictable therefore the momentum of spinning revolutions per minute (rpm) cannot be maintained without compromising with its efficiency.

Pumps have been used to compress air but they were designed to take advantage of the half cycle of the wave curve only whereas in the present device both sides of the wave curve is used, half by the buoyancy of the wave and the other half with the kinetic energy as dropping weight of the float to run the rest of the half curve of the wave with twice the outcome of compressed air production.

Some devices use water as a working medium and then convert that energy into to run water powered turbines. However, because water cannot be compressed (also known as "liquid iron" in hydraulics) this can cause problems.

Other devices use compressed air by bouncing movement of water wave. The captured energy is not even half the potential capacity of the falling weight of the wave.

Some devices have tried to keep their air pumps under the sea where the supply of ambient air is not possible and air has to be driven by some mechanical method. Other devices use a single cycle stroke or reciprocal stroke using the bouncing force of the wave but prior art has failed to extract direct energy of the weight of the sinking wave in any prior art. Even some other devices have tried to use both wave cycle energy by compressing the air in a tight vessel and decompression created by the sinking wave to run turbine but their process has a major defect of self-cancellation of two air columns in opposite direction wherein its efficiency is seriously compromised.

Some prior art devices have tried to use tension wires, springs or other mechanical methods to pull the float back but it inversely affects the performance of the compression in the first cycle and because of the resistance it deceases its compression by wasting this energy.

Some devices employ bidirectional pumps with too complex mechanisms. Their complexity is housed inside the pump body which seriously compromises its air volume in its size by taking space due to their design to let the air a passage by internal tubing and that drops its efficiency. Many inventors have tried to complete an electrical system with electrical generators at the site. Because they are designed for deep sea sites, they cannot perform with efficiency at shallow water sites.

Most prior art devices were designed to use compressed air to drive electric turbines directly, that are dependent upon the availability of waves, their strength and a waiting period for the next wave to drive the turbine with another push. They must depend on flywheels to keep the generators in motion.

Thus, there exists a need in the art for a single cylinder which captures substantially all of the potential energy available from a falling sea wave, i.e. both sides of the wave curve, including all available air energy, water buoyancy, and kinetic energy. There also exists a need in the art to store compressed air such that it can be used for different applications at will. The collection of this energy should be set to run continuously, uniformly regulated at pre-set pressure without any interruptions, and should operate regardless of the frequency of waves.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art. For example, low compressed air is produced by using both sides of the wave curve by direct bi-directional pumping. Land based compressed air tanks store that compressed air in the holding tanks and in the second phase the holding tanks energy is boosted by air powered boosters for high compression and transferred into high pressure tanks for either transportation like other fuel, electricity generation or used as a compressed air station.

It should thus be noted that the prior art focused the harness of sea wave energy in the raising cycle only using the same volume of air that originally was trapped in their respective devices, resulting in major reduction of pressure due to the same volume distributing pressure evenly in all directions diminishing the pressure based on the size of the exit hole. For example, a 5-ton thrust force by sea wave may generate less than 25) pounds per square inch (psi) based at the exit point where the turbine is set to work. The present invention can transfer the same 5 ton thrust through a shaft to the piston with a smaller diameter to compress air resulting in tremendous buildup pressure inside the pump which is useful energy when accumulated with multiple bi-directional pumps using both wave energy as well as kinetic energy using the second half of the wave curve produced by gravity.

The issue of air pressure caused by the wave must be substantial enough to open the exit valves in a pump. In the present device, this issue has been solved by designing to extract low pressure air, e.g. 50 psi, and stored in air holding tanks and then boosted by air powered boosters to compress its own air volume up to the required pressure. The air volume, usually measured in standard cubic feet per minute (scfm) is increased by using larger pumps for greater production of compressed air which is again doubled by using bidirectional pump wherein both sides of the energy of the full wave curve is extracted by the water buoyancy as well as the weight of the floating structure to exert its own weight to push the piston down by using kinetic energy caused by the wave to complete its cycle.

In preferred embodiments, the present invention will not solely use water as a working medium. Instead, the present invention uses air as a working medium for air pumping which is compressible by using the up and down as well as unidirectional column pressure to extract the maximum wave energy force in the simplest way possible. This unique process makes the float a larger piston working with water as medium, whereas the smaller piston connected with a shaft works with the air medium inside the pump to amplify the pressure directly proportional to the ratio between the smaller piston and the larger piston.

Moreover, the float is not designed for stabilization by any positive displacement of air or by any other device as it is heavily emphasized by the current technology. The present invention reverses said principle, and a maximum destabilization of the float is a requirement however a path is provided for movement to run a pumping action on both ends of the cylinder with a single piston.

It is an object, feature, and/or advantage of the present invention to use a piston directly driven by the float movement to gain full buoyancy force based on the size of the float acting as larger open piston and the other end of the piston inside the stationary pump cylinder to compress air in both up and down directions. Because there is constant pressure in the reciprocating chamber, air is continuously compressed through either the upper or lower one way valve or group of one way valves.

It is an object, feature, and/or advantage of the present invention to build stations for harmonized use between land, water near the coast line, and the deep sea or ocean. For example, the units can be designed by using the technology of making either piston or the cylinder stationary by means of cables or anchors to make them stationary as compared with a freely moving part. According to another example, the machine and process can be located near the shoreline where the appearance of waves is most visible; the "up and down" movement of waves can directly drive a simple bi directional pump to create compressed air as an energy storage medium. According to yet another example, the air pump is set above the sea level, wherein the air pump can directly take in atmospheric air; the air pump is easy to monitor, repair if needed, and remains perfectly safe for marine life and environment.

It is an object, feature, and/or advantage of the present invention to employ a duel working medium, such as water and air, independently and in total sync to extract more energy. Because air is compressible and water is substantially not, the technique will benefit from both mediums by using the up and down motion of waves to transfer that energy into the air medium to use the wave force for air compression and then use kinetic energy to multiply the gain by a factor of two in an efficient manner.

It is an object, feature, and/or advantage of the present invention to absorb the energy of the wave by aggregating an array of devices in columns. The columns act as safe barriers against high impact waves to neutralize their destructive power to a certain degree.

It is preferred the wave-powered generator be cost effective, with respect to both upfront cost and for mitigating costs associated with energy consumption. For example, low budget standalone units can provide coastal residents a source of surplus income and/or allow coastal residents to produce power for homes, marinas, and the like. Fishermen could produce power for a boat while in an anchored position. The energy provided by the wave-powered generator can help reduce carbon emissions. The only intended costs include local construction & maintenance.

It is also preferred that the wave-powered generator be durable, as ocean waves fluctuation causes sudden surges & spikes in electric power that are very harmful for the equipment and makes them burn out quickly. For example, the device should be designed such that it can be operated twenty four hours a day for seven days a week (24/7).

It is also preferred the wave-powered generator be safe to use and improve quality of life for humans an marine life living nearby. The wave-powered generator can even raise awareness of other environmental issues, including those only tangentially related. For example, the present invention can be supplemented with those devices which can decontaminate odorous salty ocean water so as to produce drinking water. The devices can be equipped with means to mitigate oil spills and/or monitor the same so as to keep our ports exceptionally clean. Further, the present invention can replace energy derived from burning fossil fuels and/or supplement those other types of renewable energy sources, including wind, solar, hydropower, and the like.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of the wave-powered generator which accomplish some or all of the previously stated objectives.

These and/or other objects, features, advantages, aspects, and/or embodiments will become apparent to those skilled in the art after reviewing the following brief and detailed descriptions of the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
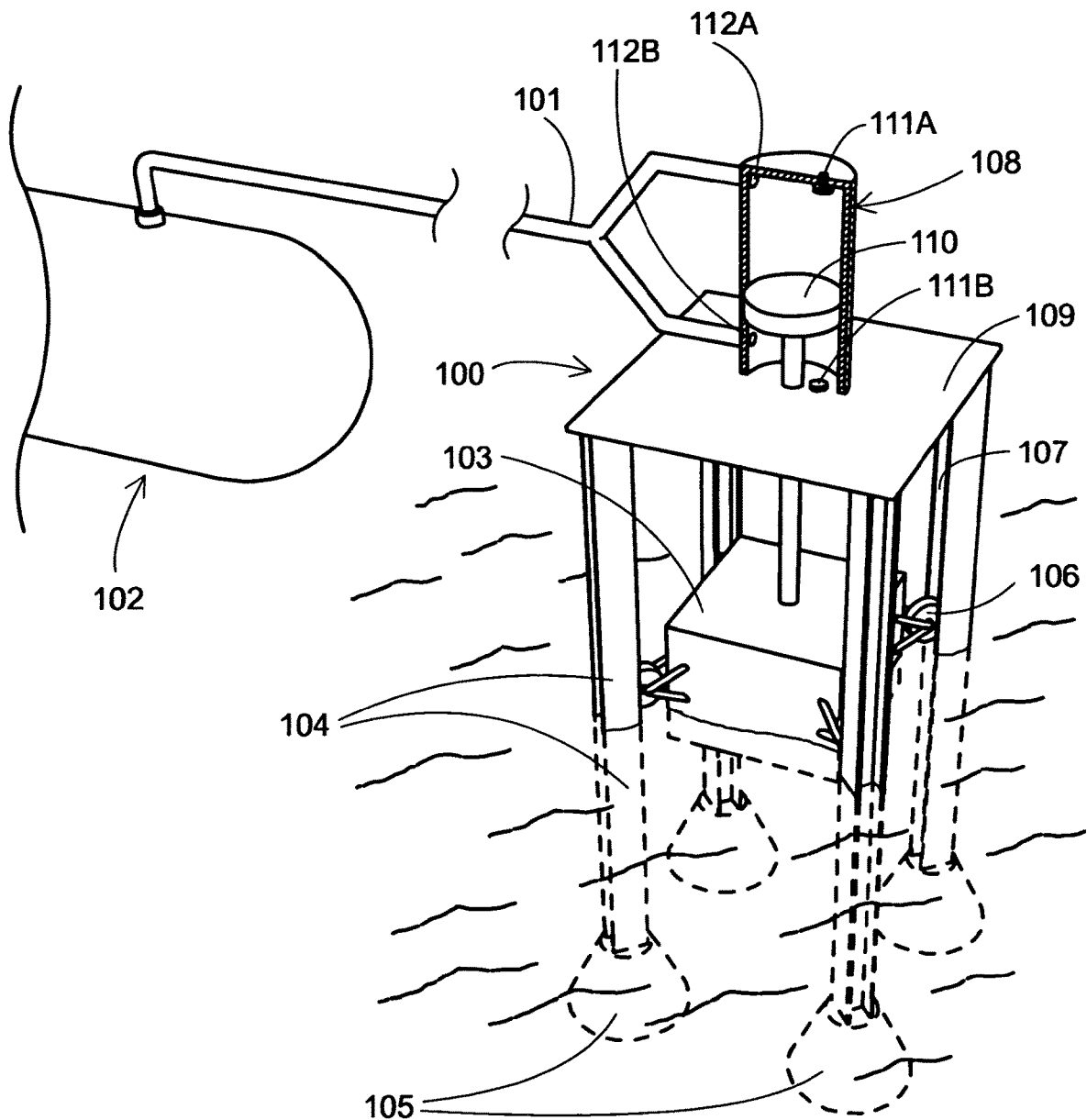
FIG. 1 shows a perspective view of a vertically mounted wave air compression station.

FIG. 1 shows the vertically mounted wave air compression station 100, which pumps air through a pipe 101 to a compressed air storage tank 102. The station is supported by posts 104, which are preferably anchored via bolts at their feet 105 in the sea floor. Other suitable means of fastening the housing of the air compression station 100 can be used. A float 103 is forced up and down by the vertical movement of the water by wave action. The float's design may be round, oval, triangle, square, rectangle, parallelogram, trapezoid, diamond shape, octagon, pentagon, hexagon, can, cube, cross, bevel, donut, chevron or any of these or a combination of these shapes, either hollow or solid or both can be made so long as they follow the basic principle of floatation and transmitting the motion of the waves to the piston.

The movement of the float 103 is guided by wheels 106 which ride in tracks 107 in the support posts 104. The wheels 106 can be substituted with holes in the float 103, if so desired. Doing so can cut costs and allows guide rods to pass therethrough, giving the float 103 a free gliding motion with the waves.

A platform 109 supports an air compression cylinder 108 above the float 103. A piston 110 mounted on the float 103 is forced up and down inside the air compression cylinder 108 such that compressed air is forced out of the cylinder 108 through a valve 112A on the upward stroke of the piston and through a valve 112B on the downward stroke. The piston 110 is housed in an upper or lower chamber of the air compression cylinder 108. Uncompressed air is sucked in, via two compressed outlets, from the external surroundings through valve 111A on the downward stroke and through valve 111B on the upward stroke. The first one way valve 111A can be located at the upper edge of the lower chamber and the second one way valve 111B can be located at the lower edge of the upper chamber. It is to be appreciated however that the one way valves 111A, 111B can be located at any other suitable locations such that the pump can collect compressed air from upper and lower chambers and additional valves can be included within any single chamber of the pump.

The preferred air compression station 100 can be made in full or in part or a combination of any or all from suitable fabrication materials like wood, foaming material, cement, plastics, synthetic material, rubber, metal or composite material or a combination of any or all of the above to perform in part or in full, for any application whether mounted or fastened to the sea floor or ground or anchored by objects heavier than water or lighter, so long as it has a stabilizing frame, a bidirectional pump or pumps mounted on a single float 103 or multiple floats, a network of pipes whether ridged or flexible to carry compressed air, compressed air holding tanks 108 made from any metal, steal, fiberglass or any composite material to withstand the air compression, air turbine or turbines to cause clockwise or counter clockwise motion to turn on the generator or generators with a gear system or direct drive and made from the material mentioned above and they follow the underlying principle to keep the float to cause up and down movement for the piston 110 for pumping action whereas the other part of the pump must be kept stationary.

However, it does not matter if the cylinder is kept in motion and the piston is stationary, so long as one part of the pump is kept stationary at a time for maximum efficiency. The stationary part may be totally ridged or may swing sideways but it must be guided either by wheels (e.g. the guide wheels 106), slides or confined space to allow the moving part to move freely with minimum friction and damage to the pump or pumps.

The design of this preferred embodiment can be made in a variety of ways. Some designs are shown in the drawings however the principle process is: first, to keep one part of the pump stationary and to use the other part as float for creating movement in a bidirectional pump and specifically up and down movement of the waves to compress air as stored energy; and second, the process or technology involves two piton attached with a rod or pipe or pipes in which larger piston is used as a float, guided to move in "up and down" movement with waves and the other end smaller piston, housed in the stationary pump to transmit the energy of the float piston to the pump piston. In the pump assembly, either the pump housing or the piston inside can be made stationary for full gain of energy.

In accordance with a preferred embodiment of the invention, the air compression station 100 operates as follows: as the current or wave rises and/or falls, the float 103 moves, causing the piston 110 to move up and down along an axis. Because there is constant pressure in the reciprocating chamber, air is continuously compressed through either the upper or lower one way valve 111A/111B or group of one way valves. The compressed air is channeled through pipes into holding cylinders 108 and thus produces useful energy. The air is collected in the holding cylinders 108 and compressed further by compressed air boosters. The compressed air is held in transportable units such that it can be used for various applications and/or to generate very low cost electricity.

In this unique process of extracting sea wave energy, the full wave curve is used. Both the water buoyancy thrust towards the upper portion of the curve as well as kinetic energy gain from the wave falling under gravity toward the lower portion of the curve can compress air in the lower chamber of the pump. This doubles the opportunity to gain energy: namely, by using the weight of the float, the connecting rod and piston 110 combine to drop freely by gravity down through its guide rails 107, compressing the air beneath the piston 110 in reverse motion and converting the sinking wave cycle into useful energy.

Figure 2:
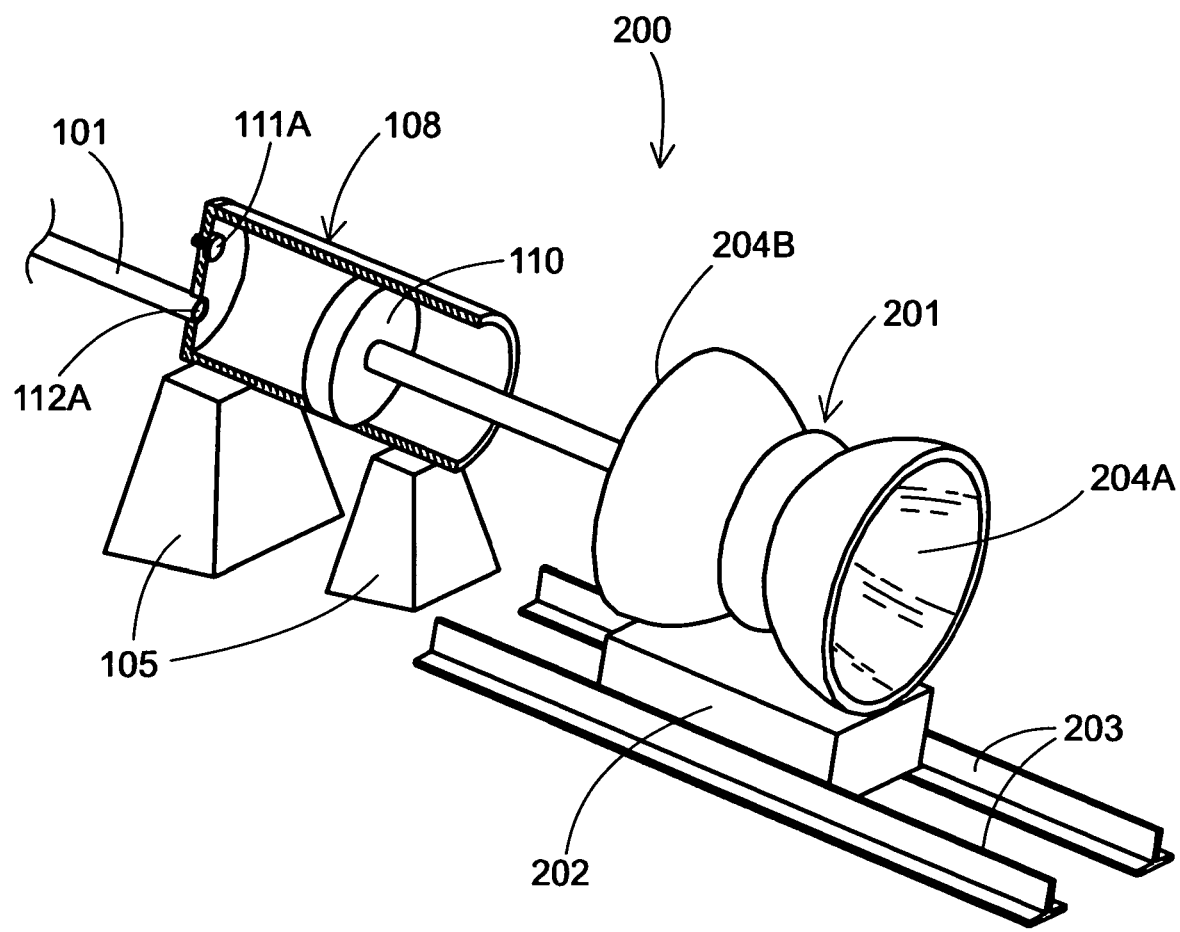
FIG. 2 shows a perspective view of an angle-mounted wave air compression station.

FIG. 2 shows the angle-mounted wave air compression station 200, pumps air through a pipe 101 to a compressed air storage tank (not shown). This station is designed to be installed in shallow water near a beach in order to harness the energy from the movement of water up and down the beach by wave action. A wave catching unit (forward momentum of wave energy extractor) 201 is mounted on a support platform 202 which slides on tracks 203 that are mounted on the sea floor up to the coast line, employs a concave cup 204A to catch onshore waves and force the wave catching unit 201 uphill on the tracks 203. Receding water is caught by concave cup 204B, forcing the wave catching unit to move back down the tracks 203, in preparation for catching the next onshore wave. A piston 110 is attached to the wave catching unit 201 and travels inside an air compression cylinder 108. The air compression cylinder 108 is mounted on supporting posts 105 to the sea floor such that it is at the approximate angle of the gradient of the beach.

Figure 3:
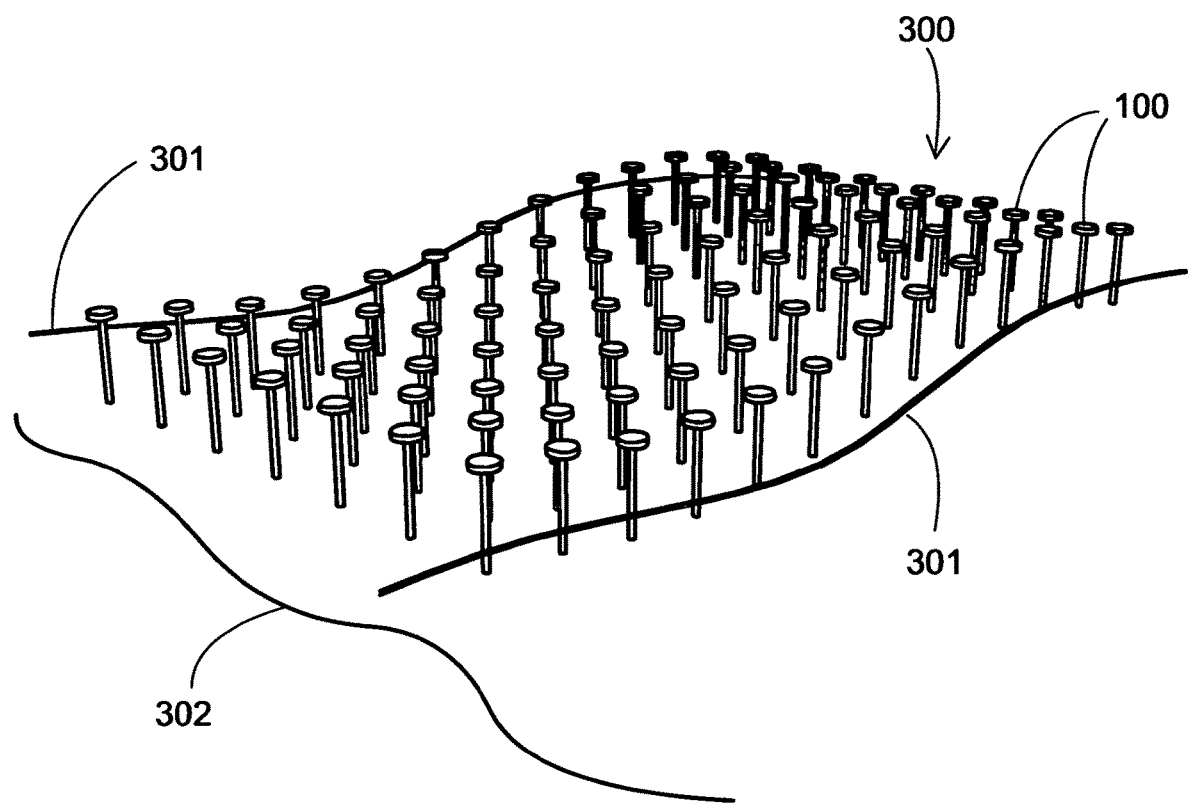
FIG. 3 shows a perspective view of an array or battery of air compression stations.

FIG. 3 represents an array 300 or battery of air compression stations 100, which are represented in the figure by simple pistons. A detailed drawing of one of these air compression stations can be found in FIG. 1. The line 301 represents the curvature of a wave as it moves through the array of air compression stations 100 toward the shoreline 302. The piston in each air compression station 100 moves vertically in accordance with the height of the wave at its location.

Figure 4:
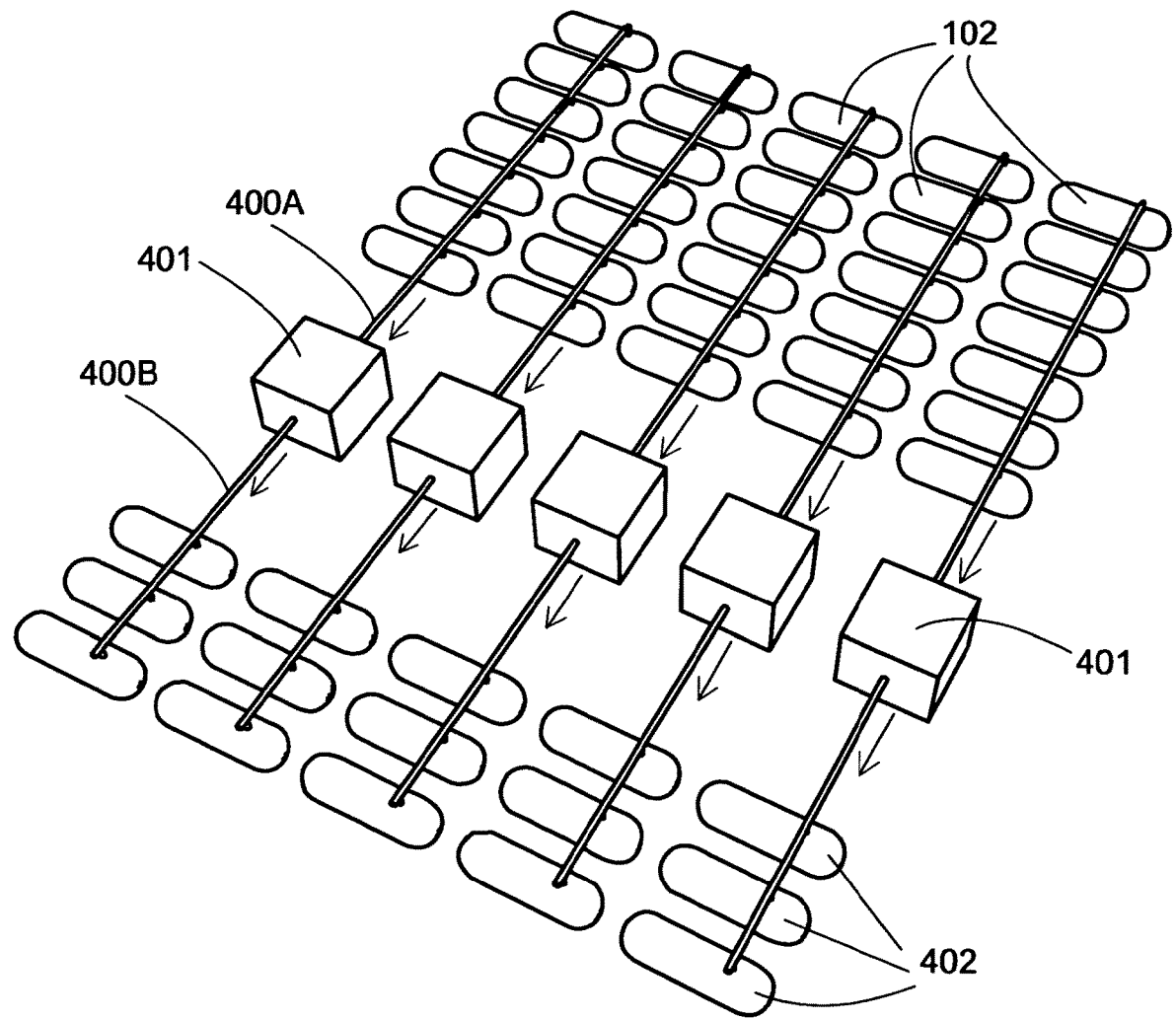
FIG. 4 shows a perspective view of an array of compressed air storage holding tanks.

FIG. 4 shows an array 300 of compressed air storage holding tanks 102, are supplied with compressed air by air compression stations 100, 200. These compressed air storage tanks 102 in turn supply excess compressed air via pipes 400A to air compressors 401. The air compressors 401 compress the air further and supply it via pipes 400B to high compression boosted compressed air tanks 402, which may be stored underground.

Figure 5:
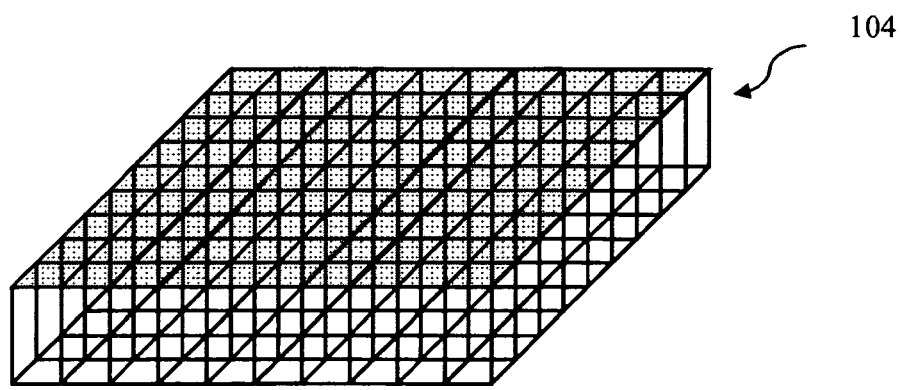
FIG. 5 shows an illustrative view of a module comprised of multiple basic unit structure.

FIG. 5 shows an array formation as module comprised of multiple basic unit structure 104 is shown to house the float and pump assembly.

Figure 6:
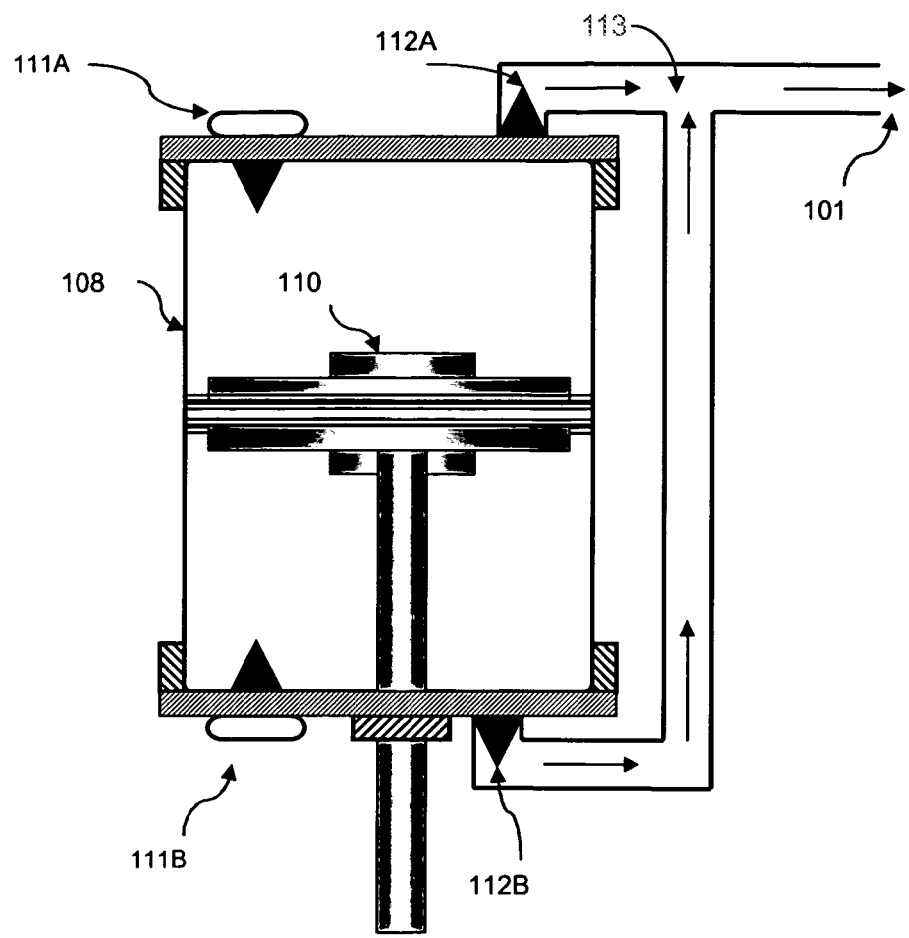
FIG. 6 details a bidirectional pump with piston and two air intake one-way valves.

FIG. 6 details a bidirectional pump with piston 110 and two air intake one-way valves 111A & 111B on each side of the pump cylinder. Compressed air outlet one-way valves 112A & 112B and connecting tube for outgoing compressed air 101 for storage are also shown.

Figure 7:
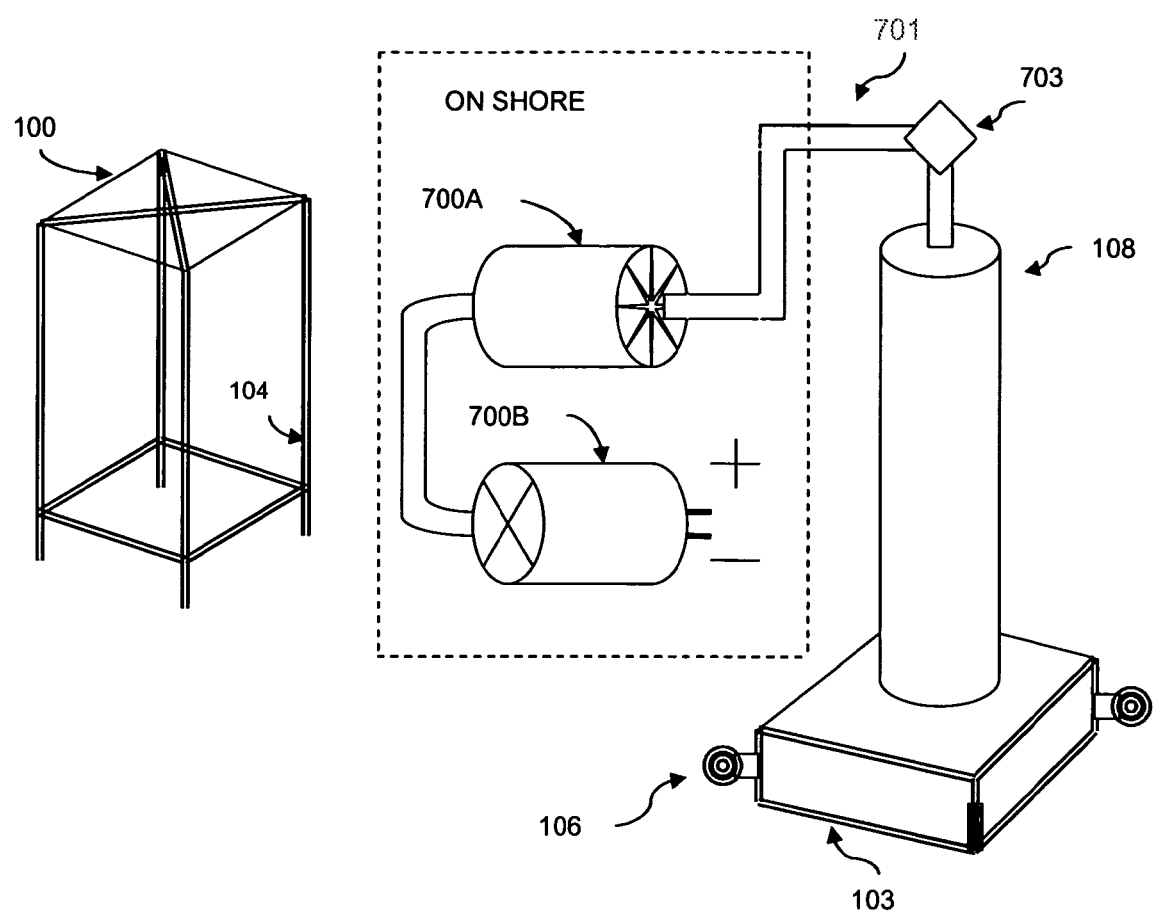
FIG. 7 shows a system view of an offshore air turbine connected with a generator via a pressure pipe.

FIG. 7 represents frame 104 with a top 100, an offshore air turbine 700A connected with a generator 700B connected by a pressure pipe 702. The pressure pipe 701 connects an air moisture remover unit 703 or dehumidifier and connected with the bidirectional pump 108 mounted over the float 103 and gliding along with its frame structure 104 with the sea waves in up and down motion with wheels 106.

Figure 8:
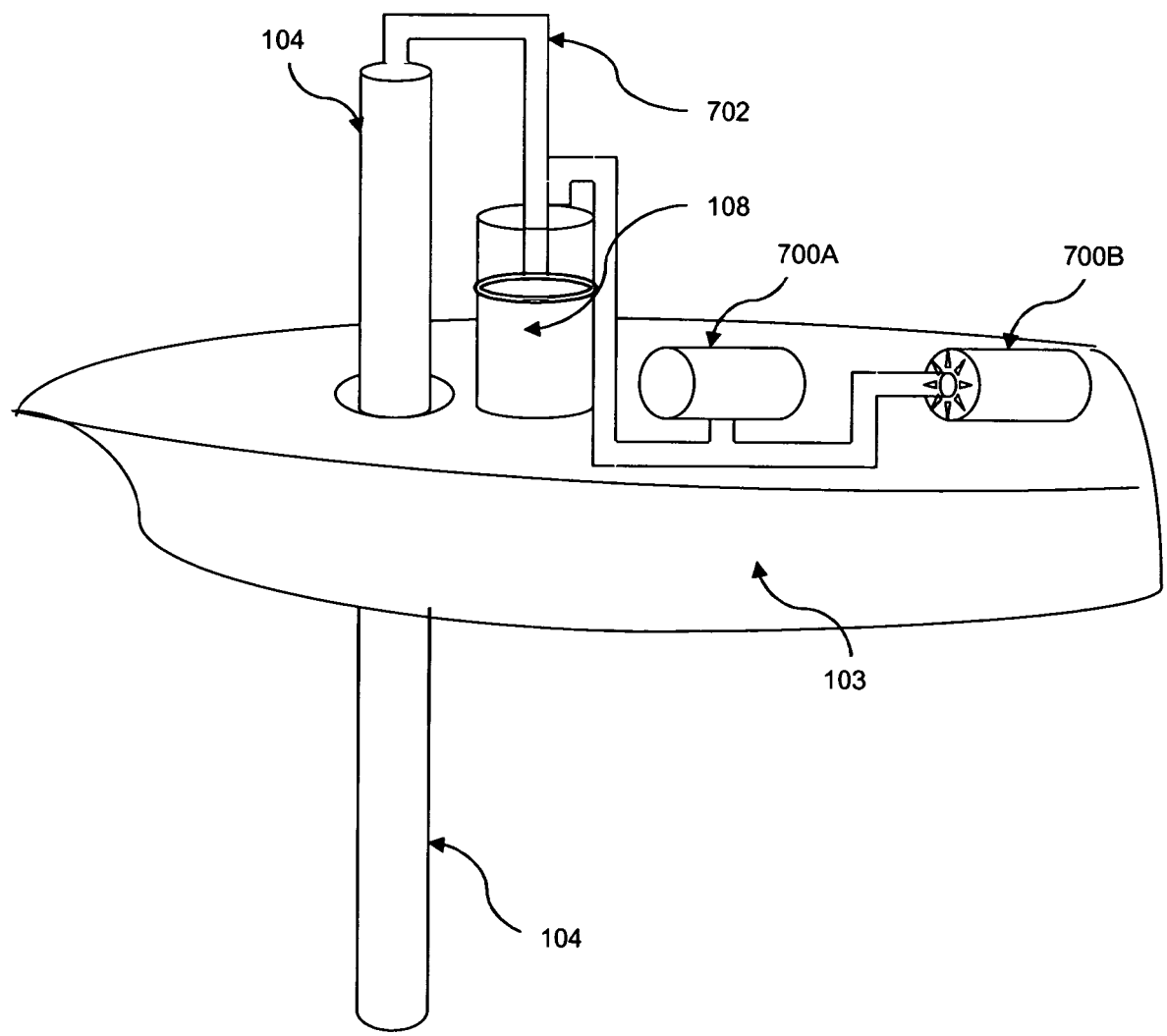
FIG. 8 shows a perspective view of a float.

FIG. 8 represents a float 103 anchored with a pier or pole 104 as stationary structure against the body of the float. A piston rod 702 stationary with structure 104 whereas the float 103 has a fixed pump cylinder 108. As the float 103 moves with the wave motion the attached pump cylinder also moves but not the piston and its attached rod. The movement of the float creates pumping action in the cylinder with stationary piston. The compressed air is fed in the air turbine 700A that is connected with a generator 700B to produce power.

Figure 9:
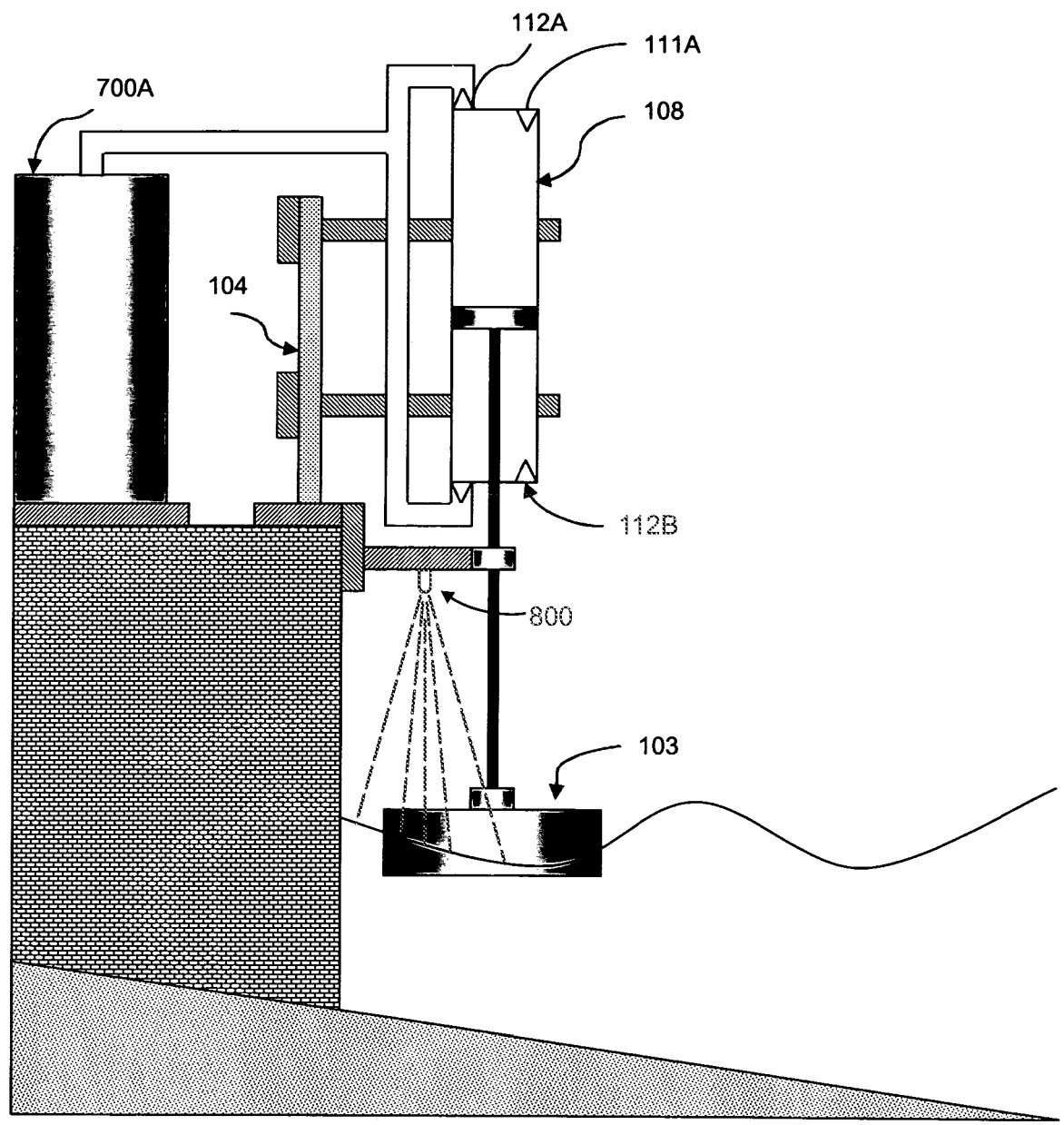
FIG. 9 shows a schematic view of a wall mounted compressed air unit where the float is connected to the piston by a rod through a guide wherein the structure holds the bidirectional pump.

FIG. 9 represents a wall mounted compressed air unit where the float 103 is connected to the piston by a rod through a guide wherein the structure 104 holds the bidirectional pump. Air inlet valves 111A & 111B let the ambient air in the expansion cycle in each chamber and one way valve 112A shown and 112B not numbered takes the compressed air into the air storage cylinder 700A wherein the cylinder and structure is bolted in the retaining wall structure.

Figure 10:
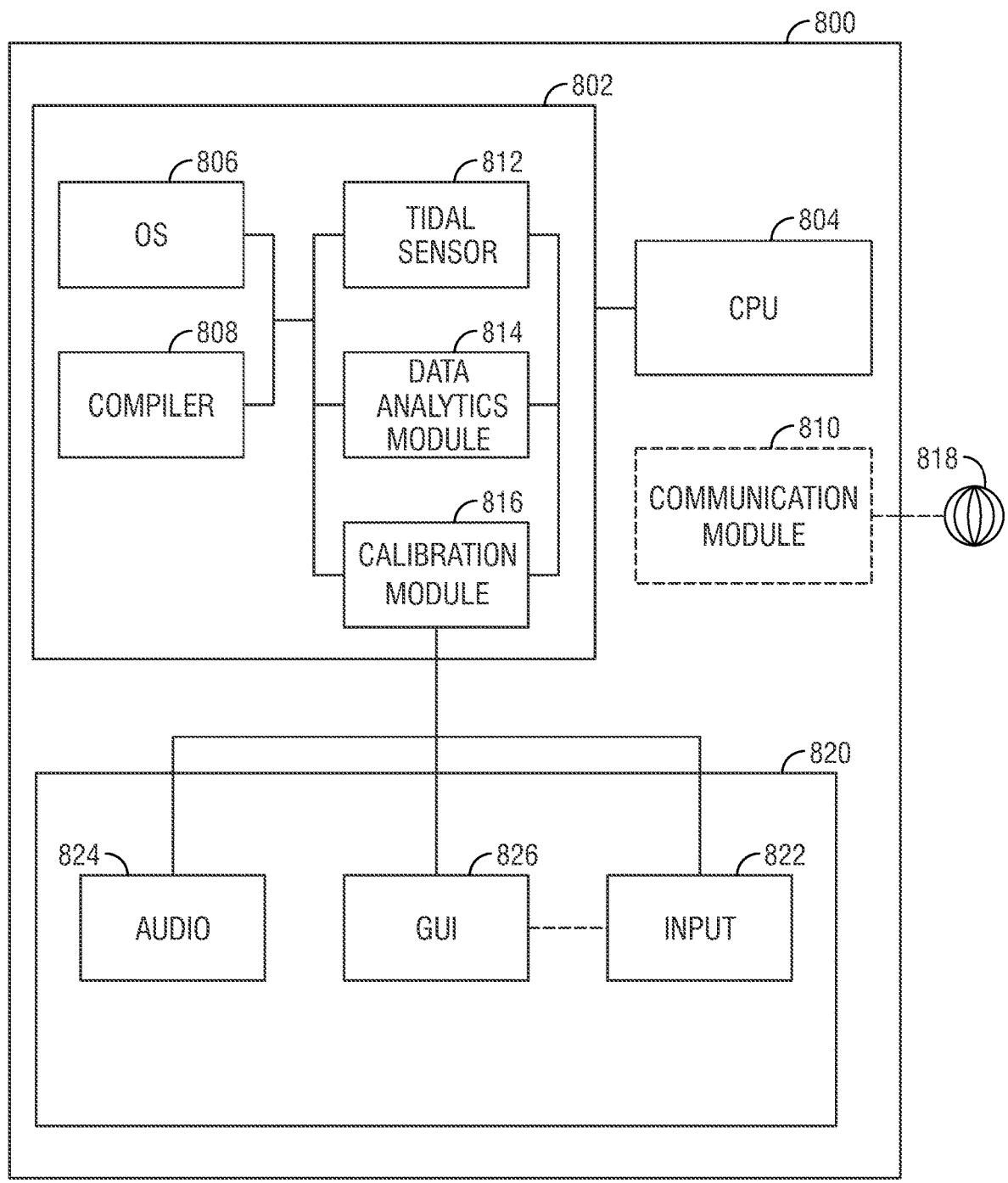
FIG. 10 shows a schematic view of an intelligent control system which can detect and control aspects related to the harnessing of renewable wave-powered energy.

FIG. 10 illustrates, schematically, a hardware environment emphasizing computing components of an exemplary intelligent control 800, which is typically a computerized system with an input/out ("I/O") board.

The intelligent control 800 includes memory 802, which has a program storage area and/or data storage area. The memory 802 comprises either read-only memory ("ROM", an example of non-volatile memory, meaning it does not lose data when it is not connected to a power source), or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc.

A central processing unit 804, such as a processor, a microprocessor, or a microcontroller, is connected to the memory 802 and is capable of executing software instructions that stored in the memory 802. The central processing unit 804 is the electronic circuit which performs operations on some external data source, such as the memory 802 or some other data stream. The central processing unit 804 performs the basic arithmetic, logic, controlling, and I/O operations specified by the instructions.

As shown in FIG. 10, aspects of the intelligent control 800, including computer hardware and software resources of the modules 812, 814, 816, are managed by an operating system 806 stored in the memory 802. More particularly, a compiler 808 allows a software application written in a programming language such as COBOL, C++, FORTRAN, or any other known programming language to be translated into code to be read by the central processing unit 804. After completion, the central processing unit 804 accesses and manipulates data stored in the memory of the non-transitory computer readable medium using the relationships and logic dictated by the software application and generated using the compiler 808.

In one embodiment, the software application and the compiler are tangibly embodied in the intelligent control 800. When the instructions are read and executed by the central processing unit 804, the intelligent control 800 performs the steps necessary to implement and/or use the present invention. A software application, operating instructions, and/or firmware (semi-permanent software programmed into read-only memory) may also be tangibly embodied in the memory 802, tidal sensor 812, data analytics module 814, calibration module 816, and/or data communication devices (e.g., communication module 810), thereby making any software application disclosed herein a product or article of manufacture according to the present invention.

The communications module 810 is capable of connecting the intelligent control 800 to a network 818, such as a cloud-computing network, and/or systems of interconnected networks, such as the Internet. In some embodiments, the intelligent control 800 and/or communications module 810 can include one or more communications ports such as Ethernet, serial advanced technology attachment ("SATA"), universal serial bus ("USB"), or integrated drive electronics ("IDE"), for transferring, receiving, or storing data. In other embodiments, a software licensing and delivery model usable in connection with the cloud-computing network can be software as a service ("SaaS"), infrastructure as a service ("IaaS"), platform as a service ("PaaS"), desktop as a service ("DaaS"), a managed service provider, mobile backend as a service ("MBaaS"), or information technology management as a service ("ITMaaS").

It is contemplated that the air compression station 100 includes sensors and/or there are sensors and/or sensing modules located nearby. Modules can be placed on and around the air compression station 100 and include various sensors to provide information to the intelligent control 800. Thus, the tidal sensor 812 may include vision sensors, radar sensors, LIDAR sensors, heat sensors, ocean water sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine ocean water characteristics, such as the ocean water's compositional make-up, temperature, and the like. The sensors can also be location sensors to determine if the air compression station 100 is located near shore, over deep ocean, etc. The location sensors can also determine areas in which the air compression station 100 is not to be operated in, based upon pre-determined and/or programmed data. The tidal sensor 812 can then indicate to actuators or other mechanisms on the air compression station 100 to prevent the air compression station 100 from floating into a dangerous area, running into an object, or otherwise putting the air compression station 100 in an undesirable situation. The tidal sensor 812 could also be used with location determining systems, such as GPS. The combination of the tidal sensor 812 and location determination systems would allow the air compression station 100 to maintain a position at a location without running into obstructions, without damaging nearby structures and/or boats, as well as with obeying other rules, such as marine regulations. The tidal sensor 812 could thus be used to alert operators of the air compression station 100 of potential problems and can thus help promote safety.

The tidal sensor 812 can sense one or more characteristics of an object and can include, for example, accelerometers, position sensors, pressure sensors (including weight sensors), or fluid level sensors among many others. The accelerometers can sense acceleration of an object in a variety of directions (e.g., an x-direction, a y-direction, etc.). The position sensors can sense the position of one or more components of an object. For example, the position sensors can sense the position of an object relative to another fixed object such as a wall. Pressure sensors can sense the pressure of a gas or a liquid or even the weight of an object. The fluid level sensors can sense a measurement of fluid contained in a container or the depth of a fluid in its natural form such as water in a river or a lake. Fewer or more sensors can be provided as desired. For example, a rotational sensor can be used to detect speed(s) of object(s), a photodetector can be used to detect light or other electromagnetic radiation, a distance sensor can be used to detect the distance an object has traveled, a timer can be used for detecting a length of time an object has been used and/or the length of time any component has been used, and a temperature sensor can be used to detect the temperature of an object or fluid.

The data analytics module 814 includes the necessary hardware and/or software components and/or is electrically connected to other computing components such that the intelligent control 800 can more efficiently store, manage, and transmit tidal data from the tidal sensor 812. The data analytics module 814 can also work in tandem with the communication module 810 to communicate (i.e. transmit and receive) tidal data among several distinct networks 818, as shown in FIG. 10. A non-exhaustive list of exemplary networks include: a wide area network ("WAN") such as a TCP/IP based network or a cellular network, a local area network ("LAN"), a neighborhood area network ("NAN"), a home area network ("HAN"), and a personal area network ("PAN"). Some networks 818 will allow communication between the communication module 810 and the central location during moments of low-quality connections. Communications through the network 818 can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

Together the modules 812, 814, 816 of the intelligent control 800 can work together to carry out various computerized methods which can facilitate the harnessing of wave energy. For example, the calibration module 816 can work with the tidal sensor 812 and other aspects of the air compression station 100 to set the float weight to a variable range preferable with available water, as compared to other known floats where the sole purpose is to be all out over the surface to remain afloat, as can be seen in FIG. 11.

Figure 11:
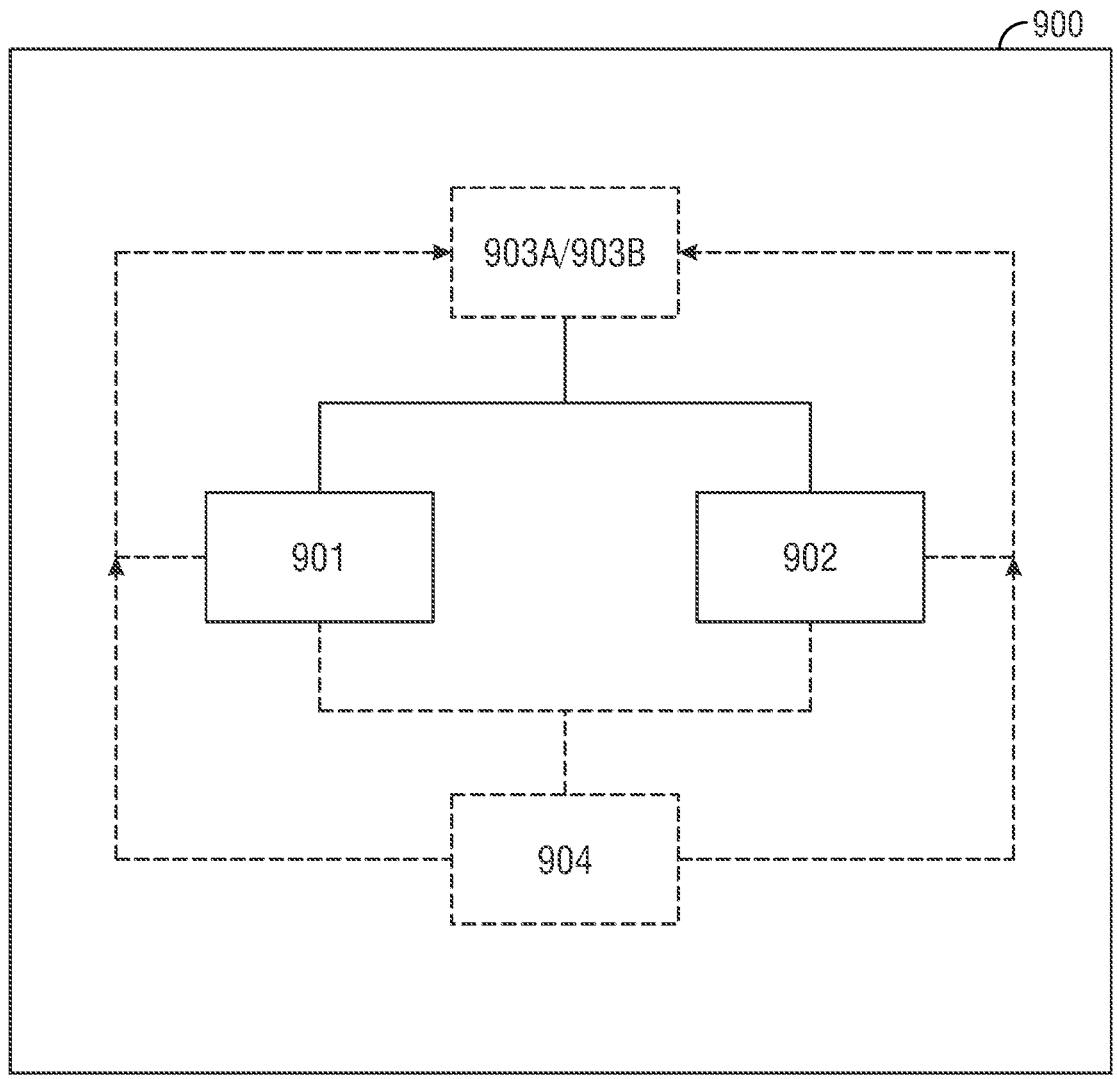
FIG. 11 shows a flow chart of an exemplary calibration method, according to some aspects of the present invention.

More particularly, FIG. 11 shows an exemplary calibration method 900, which can include mixing the ocean water 901 so as to achieve a weightlessness effect at a crescent position of the wave and using ambient air 902 in the upper variable-pressure sub-chamber to capture a buoyant force and lift the float. If needed, this calibration, and/or simple taring 903A of the device, can be set to automatically occur before operation of the air compression station 100, periodically, and/or simply to (re)synchronize 903B with the rhythm of waves.

As alluded to above, when the float 103 raises up by wave action, air is drawn in the lower chamber of the cylinder 108 via the one way valve 111A/111B. When the wave passes, the combined weight of the float 103, the connecting rod, and piston 110 compress air down that is trapped inside the lower chamber to keep on the compression in the next half cycle in the lower chamber. In other words, the kinetic energy that is built during the raising cycle of the float is used to compress the air again in its free fall position resulting in a net gain of double energy extraction by this preferred embodiment. The calibration module 816 aims to balance the float weight so as to match the buoyancy force with the free fall weight. This efficiently uses the compression of the opposing chamber to capture the other half energy of the wave.

The calibration module 816, in some embodiments, can be enhanced so as to form more of an "efficiency/energy module". Namely, the calibration module 816 can be responsible for allowing the intelligent control 800 to be able to calculate 904 the lowest tide depth to the highest tile ratio for optimum performance within a preferred tolerance. Moreover, the calibration module 816 can be used to instruct the air compression station to perform tidal tasks and/or other desirable renewable/green energy tasks, such as eliminating sea water vapor, utilizing waste heat from the device, monitoring for nearby oil spills, and the like. For example, waste can be used directly for hybrid application for rapid spray desalination, TEG power generation, running automobiles and other transport like in 1940's and/or direct running existing RO systems without any need for other external power. In yet another example, a sea water vapor elimination stage is added with automatic centrifuges operated by compressed air using its own energy for maintenance free long-life equipment.

The user interface 820, in particular, is how the user interacts with the intelligent control 800 and modules contained therein. The user interface 820 can be a digital interface, a command-line interface, a graphical user interface ("GUI") 826, any other suitable way a user can interact with a machine, or any combination thereof. For example, the user interface 820 can include a combination of digital and/or analog input/output devices or any other type of input/output device required to achieve a desired level of control and monitoring of the tidal data and/or tidal tasks (e.g. calibration). Input(s) received from the user interface 820 can be sent to a microcontroller to control operational aspects of the intelligent control 800. Examples of input devices 822 include computer mice, keyboards, touchscreens, knobs, dials, switches, buttons, etc. Examples of output devices include audio speakers 824, displays for graphical user interfaces 826, light emitting diode (LED) indicators, etc.

It is to be appreciated this device may have other power generation applications outside of harnessing wave energy to compress air in a bi-directional method which greatly reduces any wasted motion in this process. Other commercial uses and/or research purposes consistent with the objectives of the present invention are within the scope of the present disclosure. For example, the harnessed energy can be used to power automobiles.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character below and/or those elements which are near ubiquitous within the art can replace or supplement any element identified by another reference character.

100 air compression station
101 pipe
102 compressed air storage tank
103 float
104 posts
105 feet
106 wheels
107 tracks
108 air compression cylinder (fixed pump cylinder)
109 platform
110 piston
111A exemplary one-way valve
111B exemplary one-way valve
112A exemplary one-way valve
112B exemplary one-way valve
113 three-way junction
200 air compression station
201 wave catching unit
202 support platform
203 tracks
204A exemplary concave cup
204B exemplary concave cup
300 array
301 line
302 shoreline
400A upstream pipes
400B downstream pipes
401 air compressors
402 high compression boosted compressed air tanks
700A air turbine
700B generator
700A air storage cylinder
701 pressure pipe
702 piston rod
703 air moisture remover unit
800 intelligent control
802 memory
804 central processing unit
806 operating system
808 compiler
810 communications module
812 tidal sensor
814 data analytics module
816 calibration module
820 user interface
822 input device(s)
824 audio device(s)
826 display device(s) w/graphical user interfaces

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The "scope" of the present invention is defined only by the appended claims, along with the full scope of equivalents to which such claims are entitled. The scope of the invention is further qualified as including any possible combination of any of the aspects of any of the embodiments disclosed to result in additional embodiments, combinations, subcombinations, or the like that would be obvious to those skilled in the art.

What is claimed is:
1. A device for converting wave energy to compressed air comprising:
 a compression chamber comprising an upper end and a lower end at opposing ends of an axis, wherein the upper end comprises a one-way air inlet valve and a one-way compressed air outlet valve, and wherein the lower end comprises a one-way air inlet valve and a one-way compressed air outlet valve;

a piston that divides the compression chamber into upper and lower variable-pressure sub-chambers, wherein the piston is operable within the compression chamber between the upper end and the lower end;

a float external to the compression chamber;

a shaft connected between the piston and the float;

a compressed air storage tank connected to the one-way compressed air outlet valves; and an intelligent control comprising:
  a tidal sensor for capturing and/or monitoring tidal data associated with the ocean water;
  a data analytics module for storing, transmitting, and communicating said tidal data, and
  a calibration module for calibrating and/or re-calibrating the device so as to achieve a weightlessness effect at a crest position of a wave;

wherein ocean water acting upon the float is used to create a weight for capturing force of gravity in the lower variable-pressure sub-chamber and said ocean water is mixed with ambient air in the float so as to achieve the weightlessness effect at the crest position of the wave;

wherein the ambient air is used in the lower variable-pressure sub-chamber to utilize buoyancy so as to lift the float.

2. The device of claim 1 further comprising a housing anchored to the seafloor, wherein the compression chamber is mounted on the housing.

3. The device of claim 1 further comprising a track that constrains movement of the float in a direction parallel to the axis of the compression chamber when the float is acted upon by the wave.

4. The device of claim 1 further comprising a plurality of wheels attached to the float and a plurality of support posts surrounding the float such that the wheels ride on the posts to facilitate movement of the float.

5. The device of claim 1 further comprising apertures in the float through which guide rods can pass through to give the float a free gliding motion the wave.

6. The device of claim 1 further comprising a wave catching unit mounted to the float, wherein the wave catching unit comprises a concave cup at each end external to the compression chamber.

7. The device of claim 1 further comprising an additional means for storing power positioned on solid ground.

8. The device of claim 7 wherein the additional means for storing power comprises a battery.

9. The device of claim 1 further comprising a compressed air operated centrifuge.

10. The device of claim 1 wherein the one-way air inlet valve at the upper end is positioned at a lower edge of the upper variable-pressure sub-chamber and the one-way air inlet valve at the lower end is positioned at an upper edge of the lower variable-pressure sub-chamber.

11. The device of claim 1 wherein the tidal sensor comprises a vision sensor capable of determining the location of a nearby object or obstruction and the intelligent control is capable of navigating the device so as to avoid said nearby objection or obstruction.

12. The device of claim 1 wherein the tidal sensor comprises a heat sensor and an ocean water sensor for determining a temperature and a compositional makeup of the ocean water.

13. A method of harnessing tidal energy of a wave comprising:
  providing a device with a compression chamber comprising an upper end and a lower end at opposing ends of an axis, wherein the upper end comprises a one-way air inlet valve and a one-way compressed air outlet valve, and wherein the lower end comprises a one-way air inlet valve and a one-way compressed air outlet valve;
  dividing the compression chamber into upper and lower variable-pressure sub-chambers by a piston;
  determining, with the tidal sensor, a location of a float in relation to the wave, said float operatively connected to said piston;
  allowing the float to move buoyantly over the wave;
  constraining movement of the float to a direction parallel to the axis of the compression chamber when the float is acted upon by the wave;
  storing compressed air which passes through the one-way compressed air outlet valves as a result of the piston;
  using ocean water acting upon the float to create a weight for capturing force of gravity in the lower variable-pressure sub-chamber;
  mixing the ocean water with ambient air in the float so as to achieve a weightlessness effect at a crest position of the wave; and
  using the ambient air in the lower variable-pressure sub-chamber to capture a buoyant force and lift the float.

14. The method of claim 11 further comprising automatically calibrating and/or taring the device according to the tide so as to synchronize with the rhythm of waves.

15. The method of claim 14 further comprising calculating the lowest tide depth to the highest tile ratio for optimum performance within a preferred tolerance.

16. A renewable energy system comprising:
  an array of devices for converting wave energy to compressed air, said array of devices comprising at least the device according to claim 1, wherein the intelligent control communicates tidal data amongst the array of the devices; and
  a generator operatively connected to the array of devices.

17. The renewable energy system of claim 16 further comprising an offshore air turbine operatively connected with the generator by way of a pressure pipe.

18. The renewable energy system of claim 16 further comprising an air moisture remover unit or dehumidifier connected with a bidirectional pump mounted over the float.

* * * * *